United States Patent [19]
Hsieh

[11] Patent Number: 6,043,805
[45] Date of Patent: Mar. 28, 2000

[54] CONTROLLING METHOD FOR INPUTTING MESSAGES TO A COMPUTER

[76] Inventor: Kuan-Hong Hsieh, 5Fl. No. 98-3 kUANG fU S. Rd., Taipei, Taiwan

[21] Appl. No.: 09/046,598

[22] Filed: Mar. 24, 1998

[51] Int. Cl.⁷ ........................................... G09G 5/00
[52] U.S. Cl. ........................................... 345/158; 345/358
[58] Field of Search ........................ 345/145, 156, 345/157, 158, 163, 326, 358; 382/103

[56] References Cited

U.S. PATENT DOCUMENTS

| | | | |
|---|---|---|---|
| 4,988,981 | 1/1991 | Zimmerman et al. | 345/158 |
| 5,168,531 | 12/1992 | Sigel | 345/157 |
| 5,436,639 | 7/1995 | Arai et al. | 345/156 |
| 5,454,043 | 9/1995 | Freeman | 345/358 |
| 5,528,263 | 6/1996 | Platzker et al. | 345/156 |
| 5,617,312 | 4/1997 | Iura et al. | 345/157 |
| 5,686,942 | 11/1997 | Ball | 345/158 |
| 5,732,227 | 3/1998 | Kuzunuki et al. | 345/333 |
| 5,736,976 | 4/1998 | Cheung | 345/168 |
| 5,767,842 | 6/1998 | Korth | 345/168 |
| 5,864,334 | 1/1999 | Sellers | 345/158 |
| 5,982,352 | 11/1999 | Pryor | 345/158 |
| 6,002,808 | 12/1999 | Freeman | 345/158 |

Primary Examiner—Steven J. Saras
Assistant Examiner—Paul A. Bell
Attorney, Agent, or Firm—Bacon & Thomas, PLLC

[57] ABSTRACT

A controlling method for inputting messages to a computer, in which by the object, such as a hand, on the background of the capturing section of a video camera, the following parameters is set up within a computer: (1) the maximum Y point of the image of the object is assumed as a cursor, (2) the maximum X point is assumed as a click; (3) small monitoring sections are set up around the coordinate points of the cursor and click, relatively; and (4) if the distance variation between the set cursor and click points is over a allowing value, then it is judged the click has been operated. The digital image capturing by the video camera is directly transferred to a driving means or is transferred through an analog I digital signal converter to a computer for being calculated and controlled as a mouse.

20 Claims, 7 Drawing Sheets

CONTROLLING METHOD FOR INPUTTING MESSAGES TO A COMPUTER

BACKGROUND OF THE INVENTION

1. Field of the Invention

The present invention relates to a computer operation without using any substantial object, especially, to a method by which a computer is operated through the images of fingers or other proper object within a capturing section.

2. Description of the Prior Art

Mice are generally installed in computers for controlling the movement of a cursor on the display screen and for selecting or performing a work through a click. The current mouse is used to control a cursor through a ($_AX$, $_AY$) corresponding to a rolling balls. Due to mass production, the cost thereof is relatively cheap, but the fatigue of the hand and professional hurt to a computer operator are gradually serious, therefore, it is needed to develop a new mouse conforming the requirement of the ergonomics.

In U.S. Pat. No. 5,617,312, a method is disclosed in which the computer system is controlled by a message of input image form a video camera, and in which the shape of a whole hand or a special lighting pen must be identified, wherein the lighting pen is provided with a light emitting element and a switch, and by a click on the lighting pen or the conventional keyboard, the clicking in the conventional mouse is performed. The primary formed elements includes a special lighting pen, a video camera, an image signal processing circuit, an image extracting circuit, a microprocessor, a pattern recognition, analysis, and tracking circuits, a program controller, etc. Thereby, a video signal is processed outside a computer to form as a signal similar the output signal of a mouse for being transferred to a computer, wherein the operation of this converter is very complicated, hi-processing powered and with a large storing quantity. It is even greater than that of a HOST PC, thus the operation thereof is very slow and will not match the action of the computer operator, in addition, the cost thereof is very expensive so not to be widely used. Another, during operation, another special pen or other objects are necessary and the pose of a hand may not changed as pleasure, thus this design could not match the requirement of ergonomics. While the clicking selecting function is inconvenient and irrational.

SUMMARY OF THE INVENTION

Accordingly, the object of the present invention is to provide a controlling method for inputting messages to a computer without any practical mouse body.

Another object of the present invention is to provide a controlling method for inputting messages to a computer, in which additional circuit or computer are unnecessary for processing a large number of image data.

A further object of the present invention is to provide a method, in which a virtual mouse is formed by the image of the hand without the auxiliary of any other object to form as the function of a general mouse.

In order to attain said object, in the present invention, a controlling method for inputting messages to a computer is provided, in which by the object, such as a hand, on the background of the capturing section of a video camera, the following parameters is set up within a computer: (1) the maximum Y point of the image of the object is assumed as a cursor; (2) the maximum X point is assumed as a click; (3) small capturing sections are set up around the coordinate points of the cursor and click, relatively; and (4) if the distance variation between the set cursor and click points is over an allowing value, in general, if the cursor has not moved and the movement of the click is over a predetermined distance, then it is considered that the click has been operated. The digital image capturing by the video camera is directly transferred through an output end of digital image, or is transferred through an analog/digital signal converter (card) to a computer for being calculated and controlled as a mouse.

BRIEF DESCRIPTION OF THE DRAWINGS

The present invention will be better understood and its numerous objects and advantages will become apparent to those skilled in the art by referencing to the following drawings in which.

DETAILED DESCRIPTION OF THE PREFERRED EMBODIMENT

Figure 1:
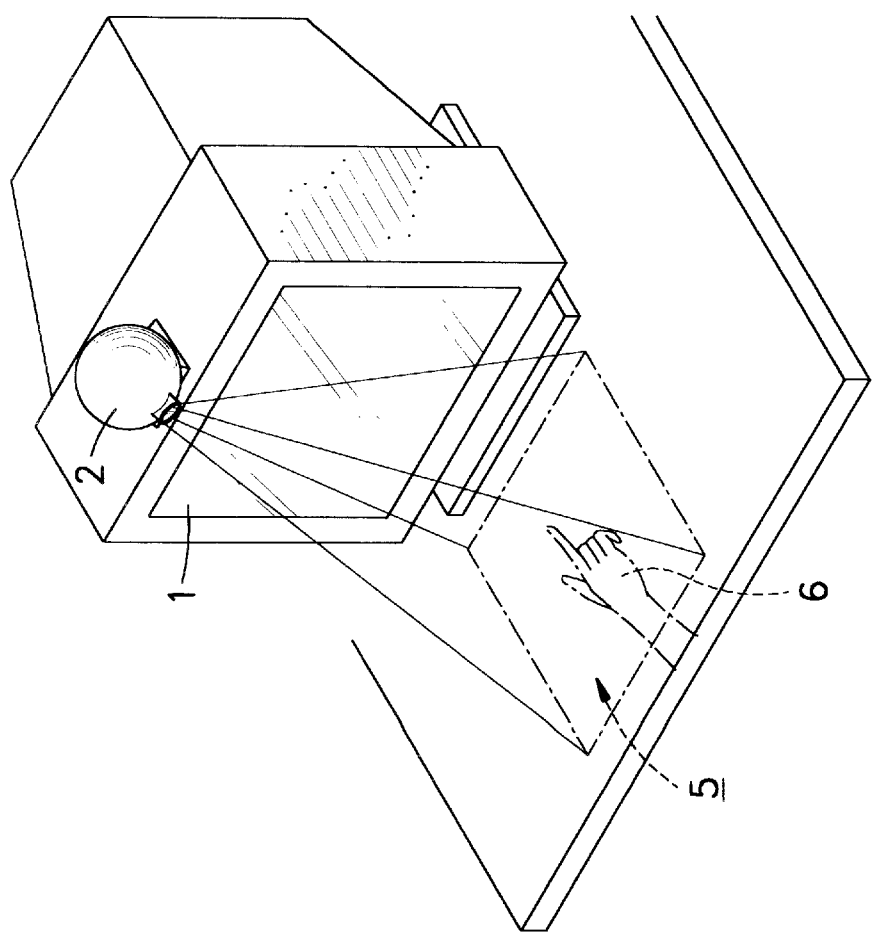
FIG. 1 is a schematic view shown the operation of a computer according to the method of the present invention.
Figure 8:
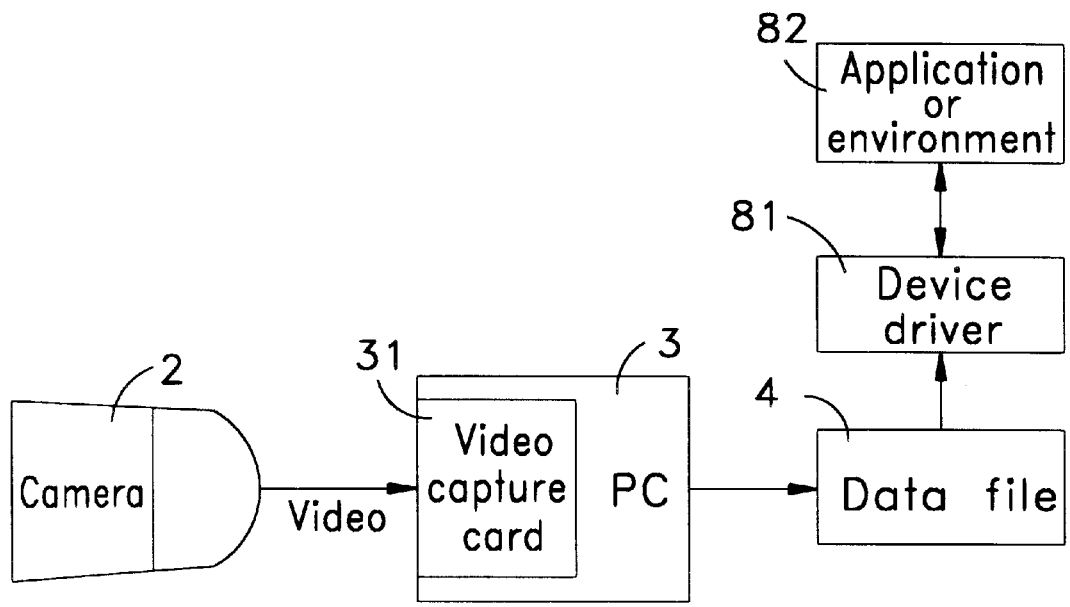
FIG. 8 is a block diagram of the construction of the present invention shown a video camera for outputting an image.
Figure 9:
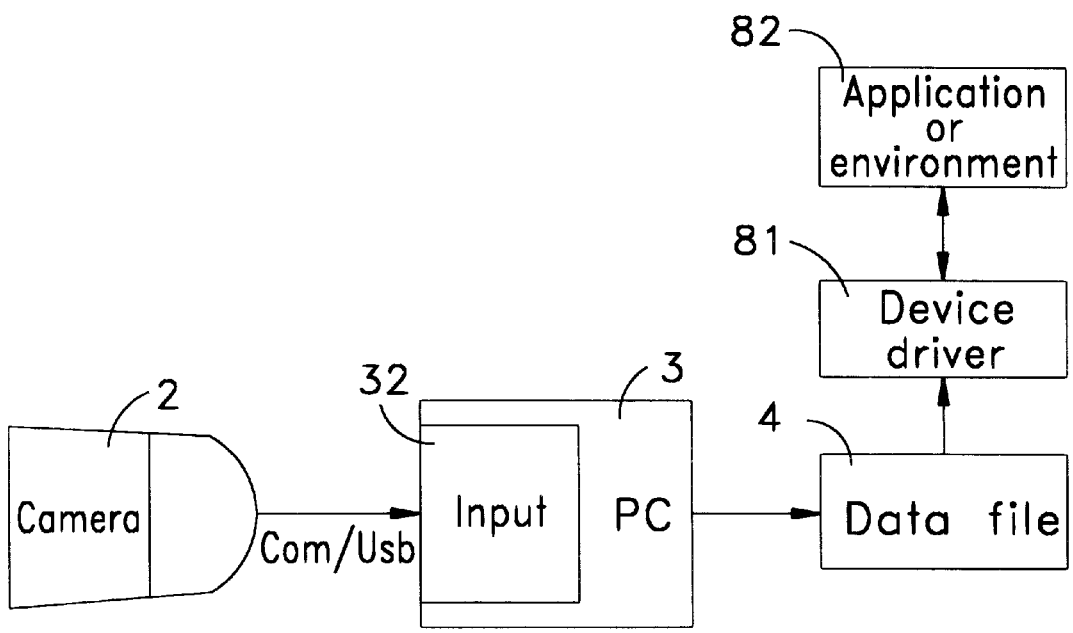
FIG. 9 is similar to FIG. 8, and shows an embodiment of a digital signal video camera.

As shown in FIG. 1, a video camera (2) may be installed on the upper end of the display screen (1) of a computer, wherein the video camera may be any current video camera used as shown in FIG. 8. The image signal is outputted from the video camera (2) and then it is inputted to a computer (3) through a video capture card (31) and a corresponding image data file (4) is then outputted. The output digital signal directly outputted from the video camera shown in FIG. 9, such as the modes of COM, USB . . . etc, is transferred into an input port (32), such as COM, USB, etc. of the digital signal of the computer (3), lastly a corresponding image data file (4) is outputted. This data may further drives the program (81) and application or environment programs (82).

Figure 2:
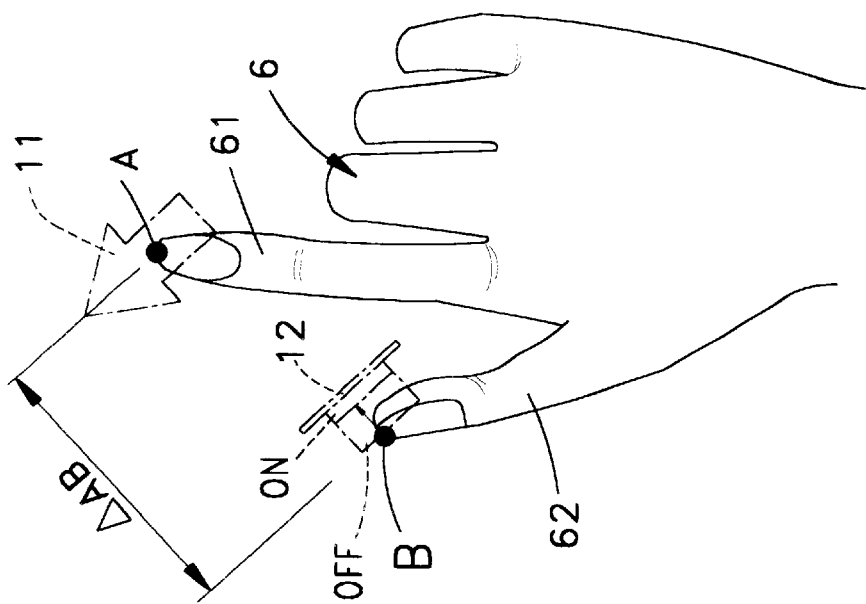
FIG. 2 is a schematic view shown that in the present invention, a cursor point and a click point are formed by the shape of a hand.
Figure 3:
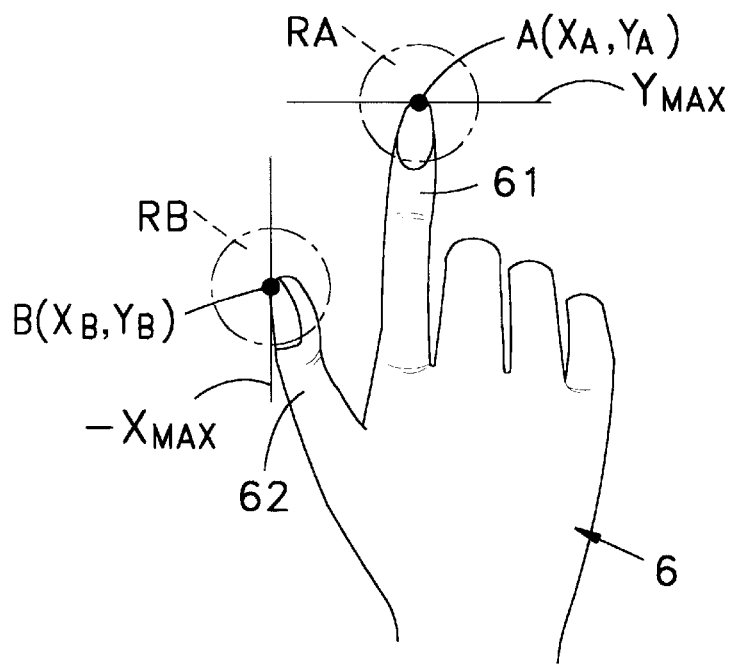
FIG. 3 is a figure describing the action for capturing the coordinates of the cursor pointer A and the click pointer B.
Figure 6:
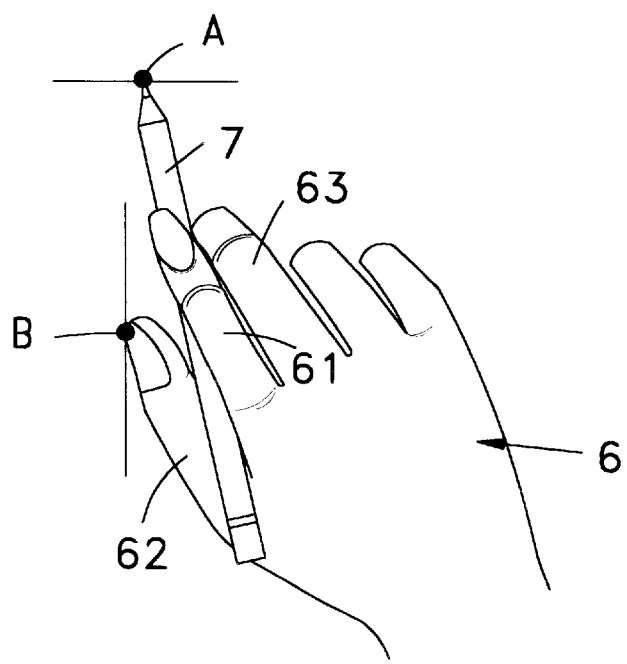
FIG. 6 described the method for capturing the pointers A and B with the hand holding a pen.

Returning to FIG. 1, any object, such as a hand (6), or a hand holding a pen as shown in FIG. 6, may be formed as a capturing image, thereby it is formed as a virtual mouse. It is preferrably to include the following steps: (A) The image of the referring background (5) is captured by a video camera and the parameters thereof is built; (B) As shown in FIGS. 2 and 3, the pointer with positive maximum Y of the intruding image, such as hand, different from the background image is captured as an pointer A of the cursor, and the allowing moving section RA is formed around the pointer A, which may be formed as a circular shape, or as a rectangular shape, or any other shape. It is preferable that a cursor symbol (11) may be displayed on the display screen; and (C) the pointer with maximum negative X of the input image is captured as a pointer B of a click, and the allowing moving section RB is formed around the pointer B, It is preferable that a click symbol (12) may be displayed on a display screen; then (D) it is preferable that a threshold value $_\Delta AB$ of the distance variation between the pointer A and pointer B is formed within an unit time T, and (E) when the distance variation between the pointer A and the pointer B is larger than $_\Delta AB$, then a click signal is generated and it is preferable that an action of clicking (ON) and sound and visual action are displayed on the display screen.

Figure 4:
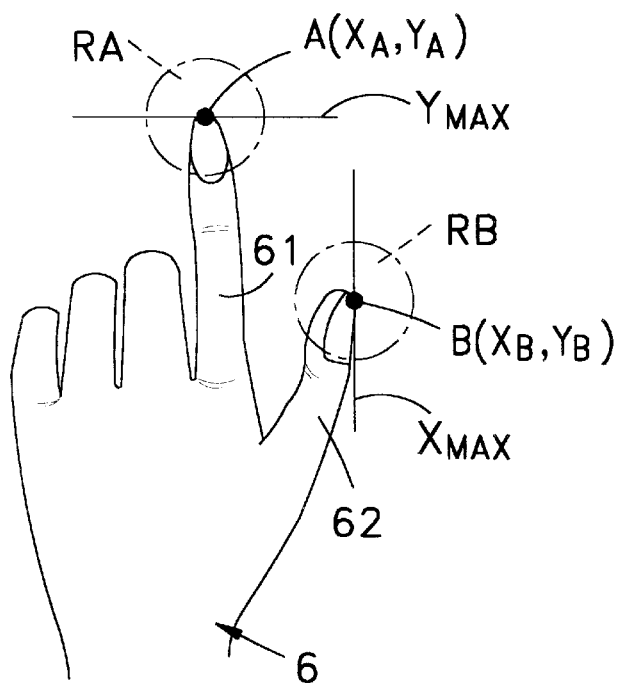
FIG. 4 is similar to FIG. 3, but the capturing coordinate of the click pointer B is not the same as that in FIG. 3.
Figure 5:
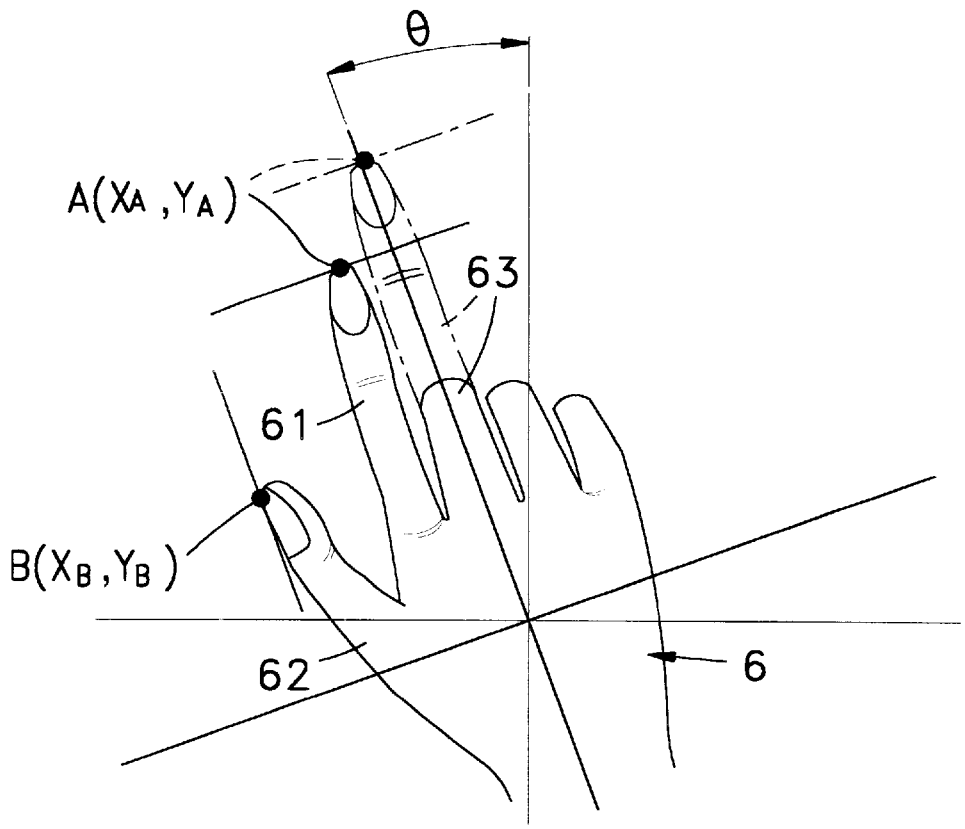
FIG. 5 is similar to FIG. 4, but shows another embodiment with an inclined angle or in which another finger is used.

For example, in the case of the hand shape, the edges of any two fingers are indicated as the relative pointer A and pointer B, it is preferable that the upper portion of the fore finger (61) is considered as $Y_{MAX}$, and the outer side of the thumb (62) is considered as $X_{MAX}$. As shown in FIG. 3, for a habitual right hand user, $X_{MAX}$ is negative, while for a habitual left hand user as shown in FIG. 4, $X_{MAX}$ is positive. It is shown in FIG. 5 that the coordinate system of the inclined θ angle may be installed. In this coordinate system, by the same method, the coordinate values of pointers A and B could be obtained. It is shown the upper portion of the middle finger (63) may also be considered as $Y_{MAX}$. In FIG. 6, by the same method, the tip of the pen (7) is considered as $Y_{MAX}$.

Figure 7:
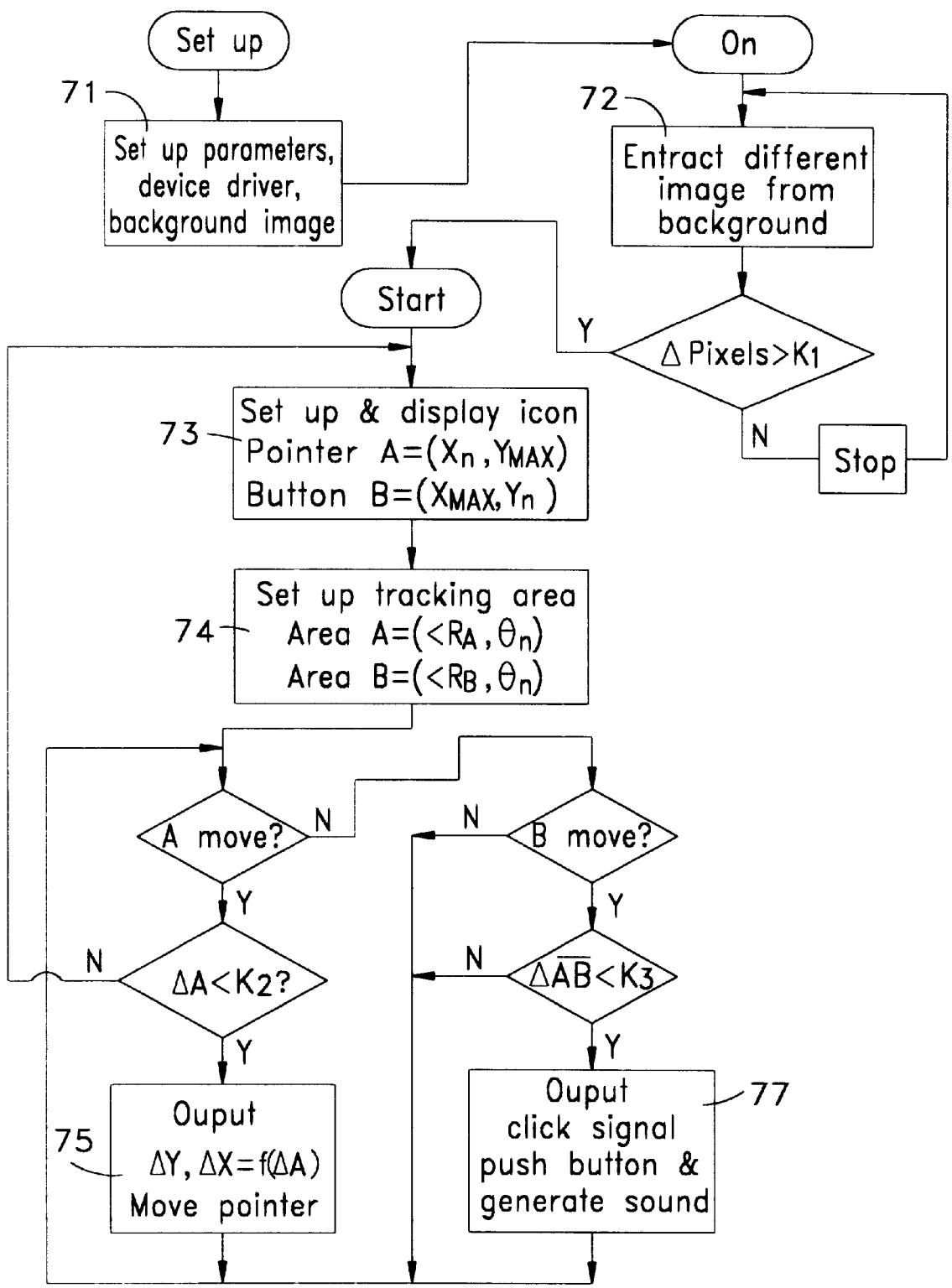
FIG. 7 is a flow diagram of the method of the present invention.

A preferable control flow of the present invention is shown in FIG. 7. At first, block (71) is to extract the image of the section of the reference background and the parameters between the driving program of the background image are formed, and then the digital signal (72) of the difference therebetween is inputted in to a driving means. It is preferable firstly to judge whether the number of the group of the pixels forming the intruding object has over the activate level, and then the maximum Y value on the intruding image of the block (73) is assumed as the pointer A (73) of the cursor, meanwhile, the maximum X value of the image is assumed as the click pointer B of the mouse, next, a monitoring section is formed on the block (74), an action allowing value $_\Delta AB/T$ (75) for the coordinate variation between the pointer A and pointer B is formed within the block (74) (it is preferable within an unit time). If the action value between the pointers A and B is larger than $_\Delta AB/T$ ($_\Delta \overline{AB} < K_3$) is a clicking action, then the output signal and sound is preferably presented as a icon, but if $_\Delta A > K2$ (out of range), a cursor will be formed again. If the pointer A moves within the monitoring section (i.e. the unit moving magnitude is less than $K_2$), then the cursor (75) is moved. If the pointer A moves over the monitoring section ( i.e. the unit moving magnitude larger than $K_2$), then the cursor is reconstructed again.

In the present invention, the virtual mouse is provided, by which the operator is not needed to hold a substantial object and the virtual mouse has not be fixed to operate within a certain section, while the procedure may be reconstructed according to the capturing image of the background section, thus the hand pose and position may be varied easily and comfortably. In the present invention, the image data of a small range around the pointers A and B is adjusted as the object of processing, therefore, the processing speed is very fast and the relative hardware necessary is also simplified and has a lower cost. If the pointer A does not move, then the B (thumb) moves to click the click. Thus the design of the present invention is extraordinary conformed with the requirement of ergonomics, instead of the prior art in which the finger must extend fully to be recognize as the cursor.

Figure 10:
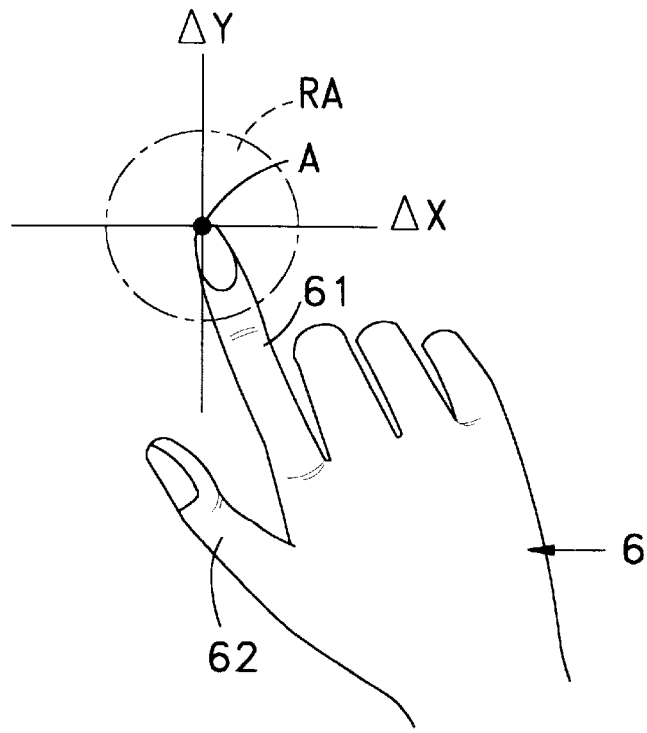
FIG. 10 shows an application embodiment of the relative indication manner of a cursor which is acted as a mouse.
Figure 11:
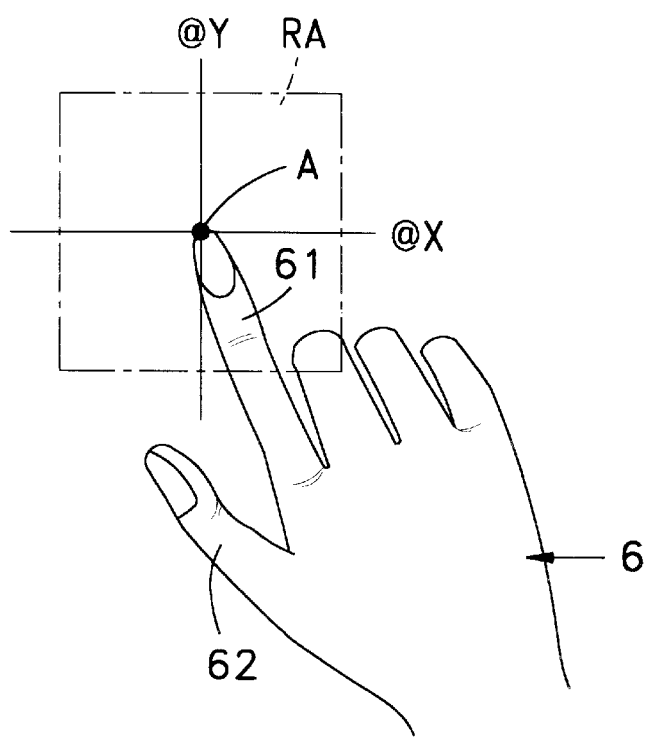
FIG. 11 shows an application embodiment of an absolute indication manner of a cursor which is acted as a digital table.

In FIG. 10, it is shown that in the present invention, a method using an absolute value of the coordinate may be used to construct the pointer A ($_\Delta X, _\Delta Y$) of the cursor as that in the prior mouse mode. Of course, as shown in FIG. 1, an absolute value of the coordinate is used to construct the pointer A (@X, @Y) of the cursor as in the conventional digital table mode.

Figure 12:
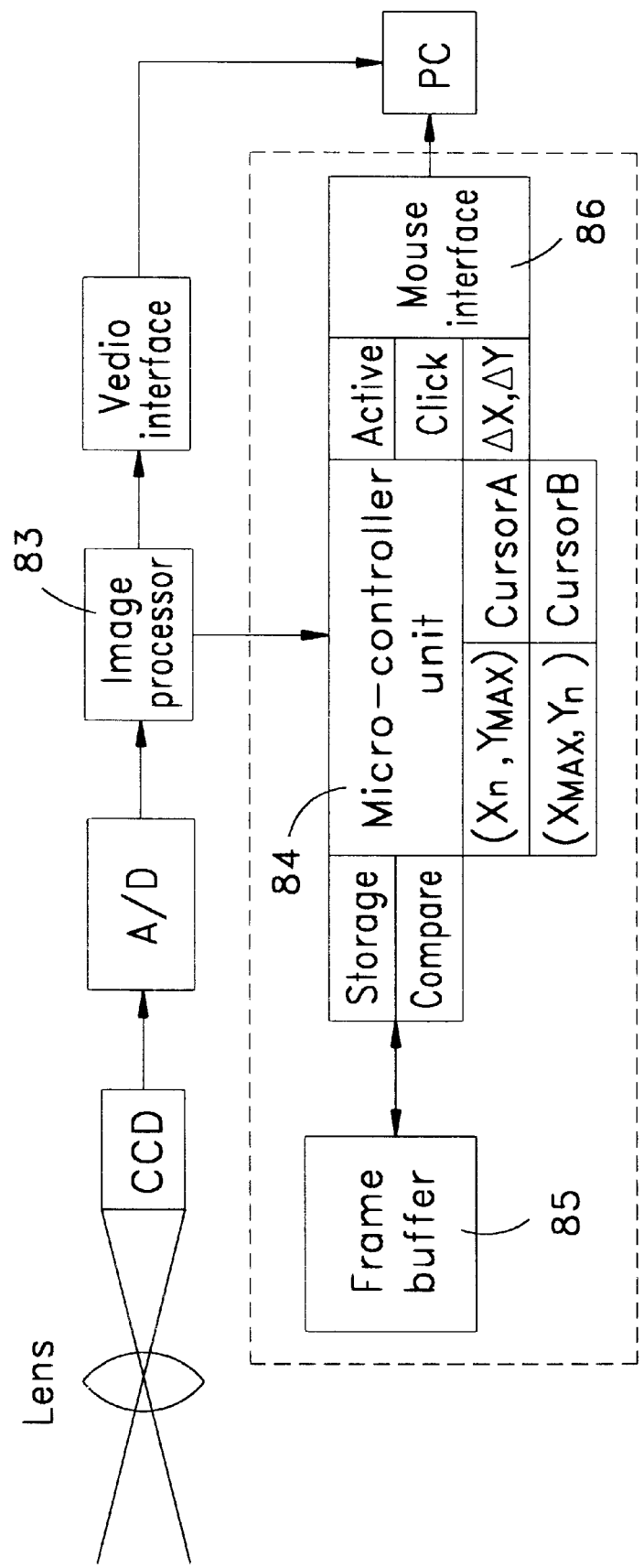
FIG. 12 is a block diagram shown the algorithm of the present invention matching with a hardware embodiment.

Furthermore, as shown in one embodiment of FIG. 12, the algorithm of the present invention may be embodied by a simple circuit, an analog or digital signal capturing by a video camera is transferred to a microprocessor (84) through an image processing circuit (83) and the background information or monitoring section is transferred to a frame buffer (85) for storing and for further comparing. According to the movement of the pointers A and B, the $_\Delta X$ and $_\Delta Y$ or @X and @Y are generated so to form a moving or clicking action through a mouse interface (86). This is an embodiment extraordinarily matching with the current computer. It is needless to say, according to the method of the present invention, the means through a hardware is also within the range of the present invention.

Although certain preferable embodiment of the present invention has been shown and described in detail, it should be understood that various changes and modification may be made therein without departing from the scope of the appended claims.

What is claimed is:

1. A controlling method for inputting messages to a computer, by which a practical mouse is needless, and the control function of mouse being formed by a capturing image of a video camera, the method including the following steps:
    (A) capturing an image of a referring background and an object image different with that of the referring background by a video camera;
    (B) capturing a maximum point in Y axis as the A point of a cursor;
    (C) capturing a maximum point in X axis as the B point of a click;
    (D) monitoring movement of pointer A, and
    (E) monitoring a distance between the pointers A and B, and as it is varied to be larger than a set value $_\Delta AB$, generating a click selecting function.

2. Controlling method according to claim 1, further including the step of setting up a monitoring section RA around the pointer A in step (B), another monitoring section RB around the pointer B in step (C), and monitoring the moving magnitude of the pointer A within the monitoring section RA in step (D).

3. Controlling method according to claim 1, wherein in step (A), an image of a hand being captured, and in steps (B) and (C), the edges of any two fingers being assumed as the pointer A and pointer B.

4. Controlling method according to claim 1, wherein in step (D), the monitoring action is complete within an unit time and the action is repeated continuously.

5. Controlling method according to claim 1, further including the step of constructing a symbol which represents a cursor and corresponds to the pointer A on the display screen and another symbol represent a click and corresponding to the pointer B.

6. Controlling method according to claim 5, wherein as a clicking action is generated in step (E), the click symbol on the display screen is also changed as pushing in.

7. Controlling method according to claim 5, wherein as a clicking action is generated in step (E), a sound is also generated.

8. Controlling method according to claim 1, wherein step (A), the image capturing by the video camera is a digital signal which is directly transferred to a driving means.

9. Controlling method according to claim 1, wherein step (A), the image capturing by the video camera is an analog signal which is transferred through an analog/digital signal converter to a driving means.

10. Controlling method according to claim 1, wherein in the step (C), the maximum negative value of the X axis is assumed as the pointer B of the click.

11. Controlling method according to claim 1, wherein in the step (C), the maximum positive value of the X axis is assumed as the pointer B of the click.

12. Controlling method according to claim 1, wherein the (X, Y) coordinate formed in step (B) and (C) is inclined with a tilting angle $\theta$.

13. Controlling method according to claim 1, wherein in step (A) an image formed by a hand holding a pen is captured, and in step (B), the tip of the pen is assumed as the pointer A.

14. Controlling method according to claim 1, wherein an image of left hand is captured.

15. Controlling method according to claim 1, wherein an image of right hand is captured.

16. Controlling method according to claim 1, wherein, in step (D), the pointer A is moved according to a relative value.

17. Controlling method according to claim 1, wherein, in step (D), the pointer B is moved according to an absolute value.

18. Controlling method according to claim 1, wherein in step (C), the edge of the thumb is assumed as the pointer B.

19. Controlling method according to claim 1, wherein in step (C), the edge of the little finger is assumed as the pointer B.

20. Controlling method according to claim 1, wherein in step (B) the edge of the fore finger is assumed as the pointer A.

* * * * *